(12) United States Patent
Howell et al.

(10) Patent No.: US 9,940,044 B2
(45) Date of Patent: *Apr. 10, 2018

(54) METHOD, APPARATUS OR SOFTWARE FOR TRANSFERRING A STORAGE REPLICATION SYSTEM BETWEEN STORAGE SYSTEMS

(71) Applicant: INTERNATIONAL BUSINESS MACHINES CORPORATION, Armonk, NY (US)

(72) Inventors: Alex S. Howell, Winchester (GB); Muhammad Zubair, Winchester (GB)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 24 days.

This patent is subject to a terminal disclaimer.

(21) Appl. No.: 15/157,604

(22) Filed: May 18, 2016

(65) Prior Publication Data
US 2016/0259582 A1   Sep. 8, 2016

Related U.S. Application Data

(63) Continuation of application No. 13/171,649, filed on Jun. 29, 2011, now Pat. No. 9,361,193.

(30) Foreign Application Priority Data

Jun. 29, 2010   (EP) .................................... 10167734

(51) Int. Cl.
G06F 17/30  (2006.01)
G06F 3/06   (2006.01)
G06F 11/20  (2006.01)

(52) U.S. Cl.
CPC ............ *G06F 3/0619* (2013.01); *G06F 3/065* (2013.01); *G06F 3/0659* (2013.01); *G06F 3/0689* (2013.01); *G06F 11/2069* (2013.01); *G06F 17/30557* (2013.01)

(58) Field of Classification Search
CPC ......... G06F 17/30575; G06F 17/30578; G06F 17/30581; G06F 17/30584
See application file for complete search history.

(56) References Cited

U.S. PATENT DOCUMENTS

| | | | |
|---|---|---|---|
| 6,615,223 | B1 | 9/2003 | Shih et al. |
| 7,305,418 | B2 | 12/2007 | Benhase et al. |
| 7,523,408 | B2 | 4/2009 | Barrios et al. |
| RE43,571 | E | 8/2012 | Boothby |
| 2003/0204557 | A1 | 10/2003 | Mandal et al. |
| 2007/0220248 | A1 | 9/2007 | Bittlingmayer et al. |
| 2007/0244908 | A1 | 10/2007 | Rajan |

*Primary Examiner* — Robert Beausoliel, Jr.
*Assistant Examiner* — Nirav K Khakhar
(74) *Attorney, Agent, or Firm* — Griffiths & Seaton PLLC

(57) ABSTRACT

A method, apparatus or software is disclosed for transferring storage replication system configurations between heterogonous storage systems.

20 Claims, 6 Drawing Sheets

METHOD, APPARATUS OR SOFTWARE FOR TRANSFERRING A STORAGE REPLICATION SYSTEM BETWEEN STORAGE SYSTEMS

PRIORITY CLAIM

This Application is a Continuation of U.S. patent application Ser. No. 13/171,649, filed on Jun. 29, 2011, which claims priority to European Patent Application 10167734.2, filed Jun. 29, 2010, both of which are hereby incorporated by reference in their entirety.

BACKGROUND OF THE INVENTION

Field of the Invention

The present invention relates to a method, apparatus or software for transferring storage replication systems between storage systems.

Description of the Related Art

Computer systems commonly comprise storage systems generally dedicated to providing high availability and high reliability data storage. Storage systems are generally provided by a group of storage devices managed by a storage system controller. Storage systems are commonly designed around specific storage system controller protocols or specific storage devices. As a result, the configuration of such storage systems requires knowledge of the relevant storage system controller protocols and storage devices.

One function that is commonly implemented in storage systems is storage element or disk replication, which provides data redundancy by ensuring that two or more identical copies of data sets are stored in the storage system. In its simplest form, disk storage replication comprises disk mirroring. As storage systems increase in size and usage, more complex storage replication methods are introduced to maintain these storage systems and to improve their availability and reliability. Such complexity results in the configuration and maintenance of such storage systems being a specialist, complex and costly process.

SUMMARY OF THE INVENTION

An embodiment of the invention provides a method for transferring a storage replication system between storage systems, the method comprising the steps of: retrieving storage replication system configuration data for a source storage system, said storage replication system configuration data being data representing a configuration of a storage replication system, said storage replication system configuration data being provided in a source form for said source storage system; translating said storage replication system configuration data from said source form into a canonical form for representing said storage replication system; determining a set of configuration commands for implementing said storage replication system configuration data on a target storage system based on said canonical form of said translated storage replication system configuration data and a predetermined set of one or more storage system specific rules, the storage system specific rules applicable to heterogeneous groups of devices; and transferring the storage replication system from said source storage system to said target storage system, said configuration commands being used to configure said storage replication system on said target storage system.

The method may comprise the steps of: determining a set of one or more storage system specific rules for identifying the compatibility of elements of the storage replication system with the target storage system; and applying the storage system specific rules so as determine whether the storage replication system is compatible with the target storage system. The method may comprise the steps of: determining a set of one or more user defined policy rules for determining whether elements of the storage replication system meet one or more predetermined performance criteria with respect to the target storage system; and applying the user defined policy rules to the storage replication system with respect to the target storage system so as to determine whether the storage replication system would meet the predetermined performance criteria if configured on the target storage system.

The rules may be arranged for application to the storage replication system configuration data in the canonical form. The rules may be applied to the storage replication system configuration data in response to the translation into the canonical form. The rules may be applied to the storage replication system configuration data in response to editing of the storage replication system configuration data in the canonical form. The storage replication system configuration data may be retrieved from the source storage system via one or more command line interface (CLI) queries. The set of configuration commands for the target system may comprise CLI commands. A graphical user interface (GUI) may be provided for editing the storage replication system configuration data in the canonical form. The method may comprise the further step of receiving storage replication system configuration data in the canonical form from a third party for editing or determining a set of configuration commands for configuring a storage replication system on a target storage system.

Another embodiment provides apparatus for transferring a storage replication system between storage systems, the apparatus being operable to:

retrieve storage replication system configuration data representing a storage replication system for a source storage system, the storage replication system configuration data being provided in a source form for the source storage system;

translate the storage replication system configuration data from the source form into a canonical form for representing the storage replication system;

select a target storage system for transfer of the storage replication system; and determine a set of configuration commands for the target storage system, the configuration commands being arranged to configure the storage replication system on the target storage system.

A further embodiment provides a computer program comprising program code means adapted to perform a method for transferring a storage replication system between storage systems, the method comprising the steps of:

retrieving storage replication system configuration data representing a storage replication system for a source storage system, the storage replication system configuration data being provided in a source form for the source storage system;

translating the storage replication system configuration data from the source form into a canonical form for representing the storage replication system;

selecting a target storage system for transfer of the storage replication system; and determining a set of configuration commands for the target storage system, the configuration commands being arranged to configure the storage replication system on the target storage system.

Another embodiment provides a computer program comprising program code means adapted to provide apparatus for transferring a storage replication system between storage systems, the apparatus being operable to:

retrieve storage replication system configuration data representing a storage replication system for a source storage system, the storage replication system configuration data being provided in a source form for the source storage system;

translate the storage replication system configuration data from the source form into a canonical form for representing the storage replication system;

select a target storage system for transfer of the storage replication system; and determine a set of configuration commands for the target storage system, the configuration commands being arranged to configure the storage replication system on the target storage system.

BRIEF DESCRIPTION OF THE DRAWINGS

Embodiments of the invention will now be described, by way of example only, with reference to the accompanying drawings in which.

DETAILED DESCRIPTION OF THE DRAWINGS

Figure 1:
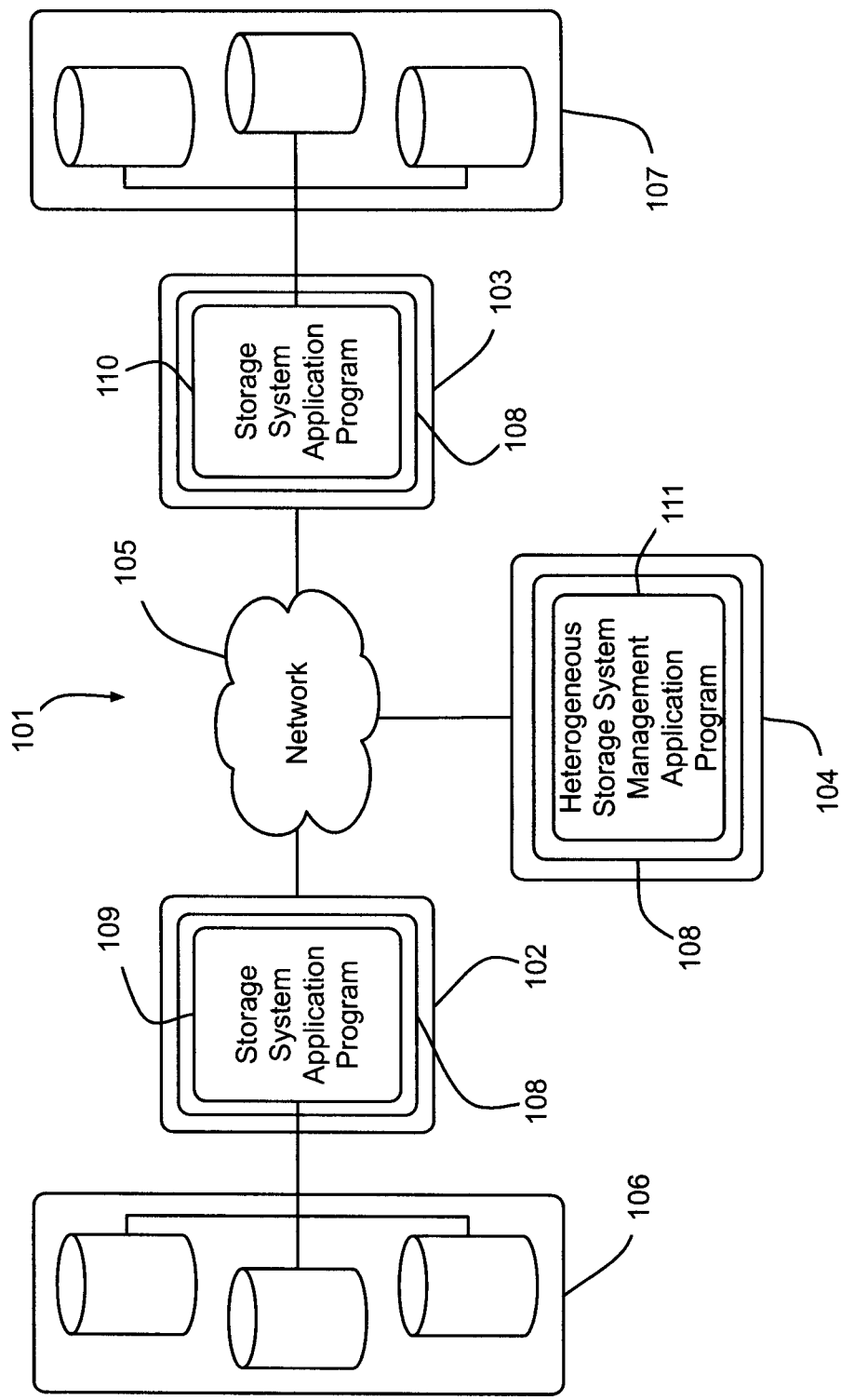
FIG. 1 is a schematic illustration of a computer network comprising a plurality of storage systems.

With reference to FIG. 1, a computer system 101 comprises a first, second and third computers 102, 103, 104 interconnected by a network 105. A first and second set of storage devices in the form of disc arrays 106, 107 are connected to the first and second computers 102, 103 respectively. Each of the computers 102, 103, 104 is loaded with an operating system 108 for providing a platform for one or more application programs. The first and second computers 102, 103 are loaded with first and second storage system application programs 109, 110 arranged to provide high reliability and availability storage systems for use via the network 105. The storage capacity provided by the storage system application programs 109, 110 is provided from the respective storage devices 106, 107.

In the present embodiment, the respective storage system application programs 109, 110 are heterogonous, that is, they utilise differing, non-compatible protocols for configuring respective storage systems. Such storage systems may implement one or more storage replication systems (SRS) for replicating storage so as to provide higher reliability or availability. In one of its simpler forms, the SRS may comprise disk mirroring. The storage system application programs 109, 110 are each arranged to implement a given SRS in response to the input of configuration instructions by a user in the form of storage replication system configuration commands (SRSCC). In response to a valid set of SRSCCs, the storage system application programs 109, 110 are arranged to implement the requested SRS. Within the given storage system application programs 109, 110 the requested SRS is represented by storage replication system configuration data (SRSCD). Each of the storage system application programs 109, 110 used differing forms of SRSCD.

Figure 2:
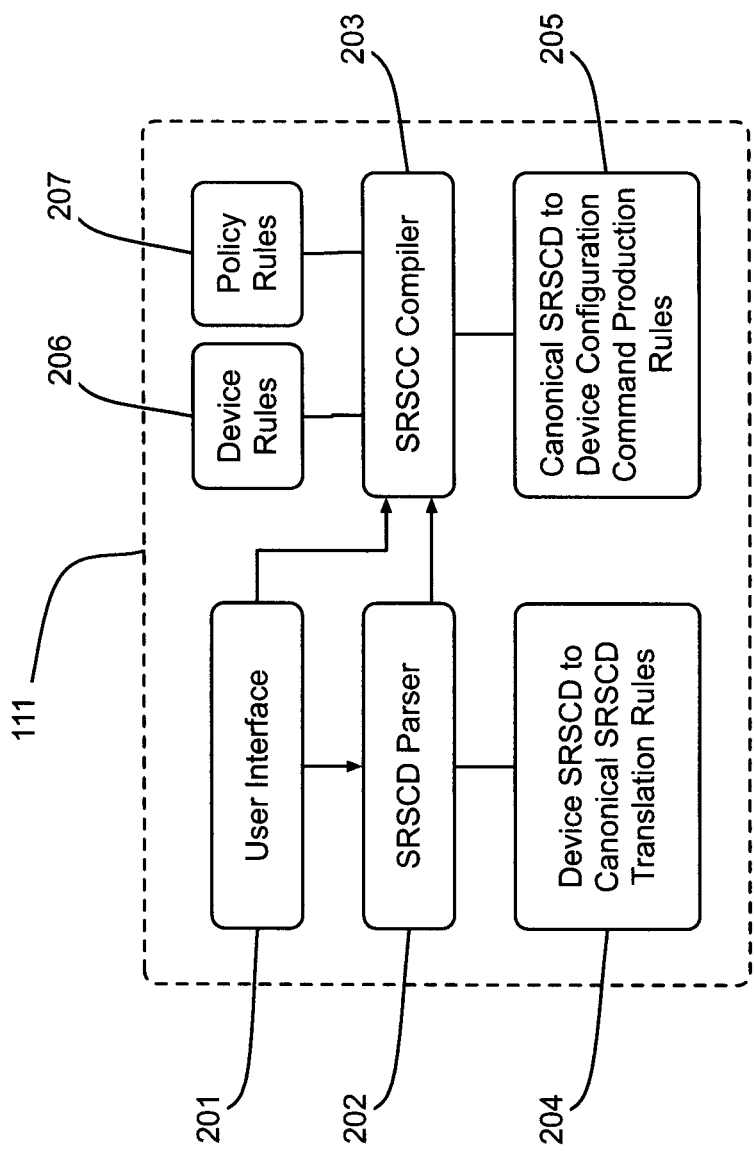
FIG. 2 is schematic illustration of an application program for transferring a storage replication system between the storage systems of FIG. 1.

The third computer 104 is loaded with a heterogonous storage system management application program (HSSMAP) 111. In the present embodiment, the HSSMAP 111 is arranged to enable the transfer of SRSs between heterogonous storage systems such as those provided by the storage system application programs 109, 110 in the present embodiment. With reference to FIG. 2, the HSSMAP 111 comprises a user interface 201, an SRSCD parser 202 and an SRSCC compiler 203. The user interface 201 is arranged to enable a user to identify and select an SRS in a source storage system and automatically transfer the selected SRS to a selected target storage system. The SRSCD parser 202 is arranged to input the SRSCD for the selected SRS in the source storage system and to translate the SRSCD into a common intermediate form, that is, into a predetermined canonical form defined for the HSSMAP 111. The translation process is performed in accordance with a set of predetermined rules 204 that define the translation process for the SRSCD between its source storage system form and the canonical form.

The SRSCC compiler 203 is arranged to determine a set of SRSCDs for configuring the selected SRS on the selected target storage system. The set of SRSCDs is determined in accordance with a set of predetermined production rules 205 that define the production process of a suitable set of SRSCCs for implementing the selected SRS on the selected target storage system. The set of SRSCCs are produced from the input SRSCD in its canonical form. In the present embodiment, the SRSCC compiler 203 is further arranged to apply further sets of rules 206, 207 to the SRSCD in its canonical form. The first set of rules 206 are a set of predetermined device specific rules referred to herein as device rules 206. The device rules 206 comprise rules for application to the selected SRSCD for identifying elements of the SRSCD that are not compatible with the target storage system. In other words, the device rules 206 are arranged to identify whether the set of SRSCC produced from the SRSCD would comprise an acceptable set of commands for the target storage system. The second set of rules 207 are a set of user determined policy rules herein referred to as policy rules 207. The policy rules define a set of criteria for the SRS, such as performance criteria or hardware requirements.

Figure 3:
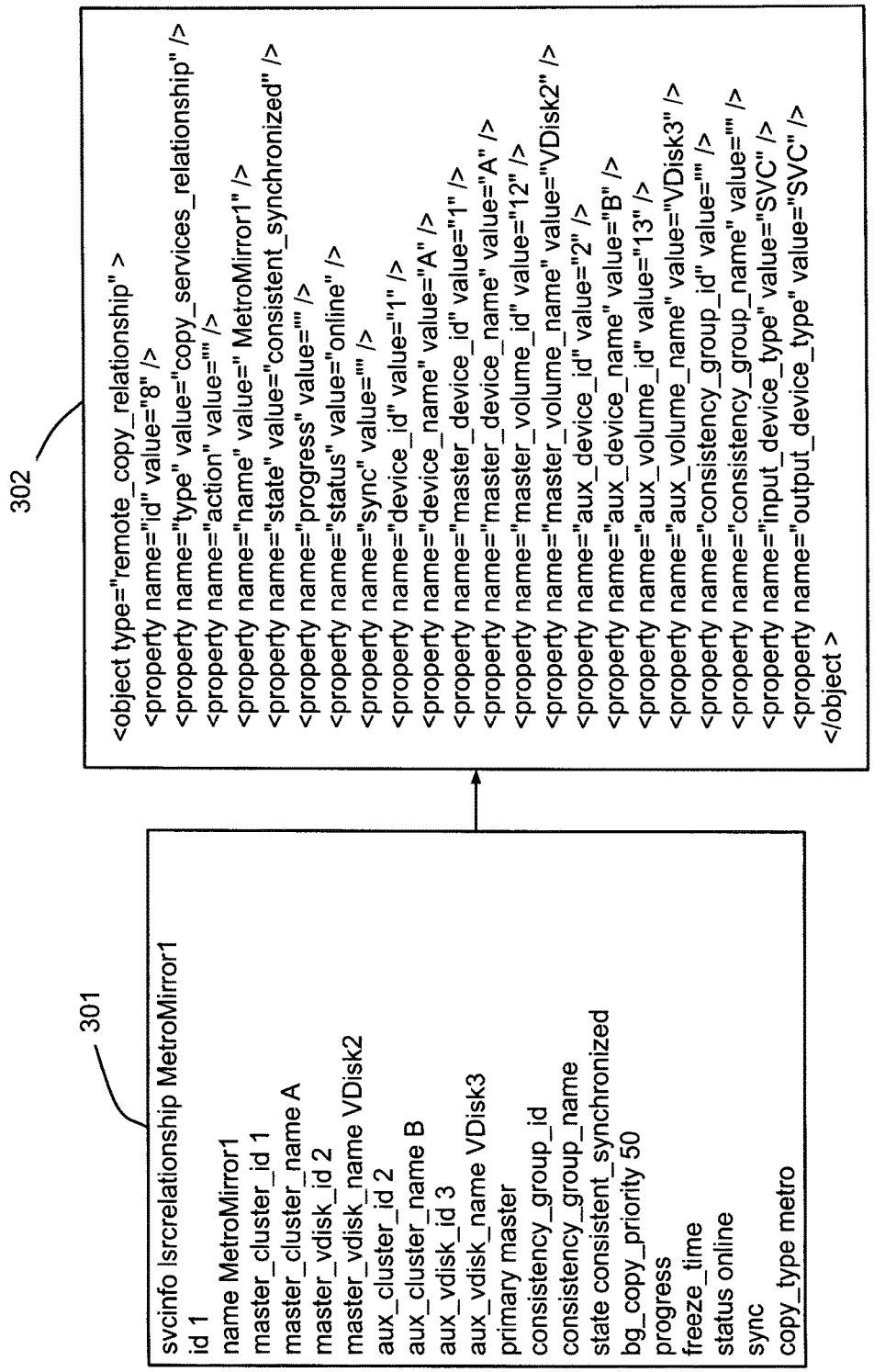
FIG. 3 is an example of the translation of storage replication system configuration data for a first storage system of FIG. 1 into a canonical form.
Figure 4:
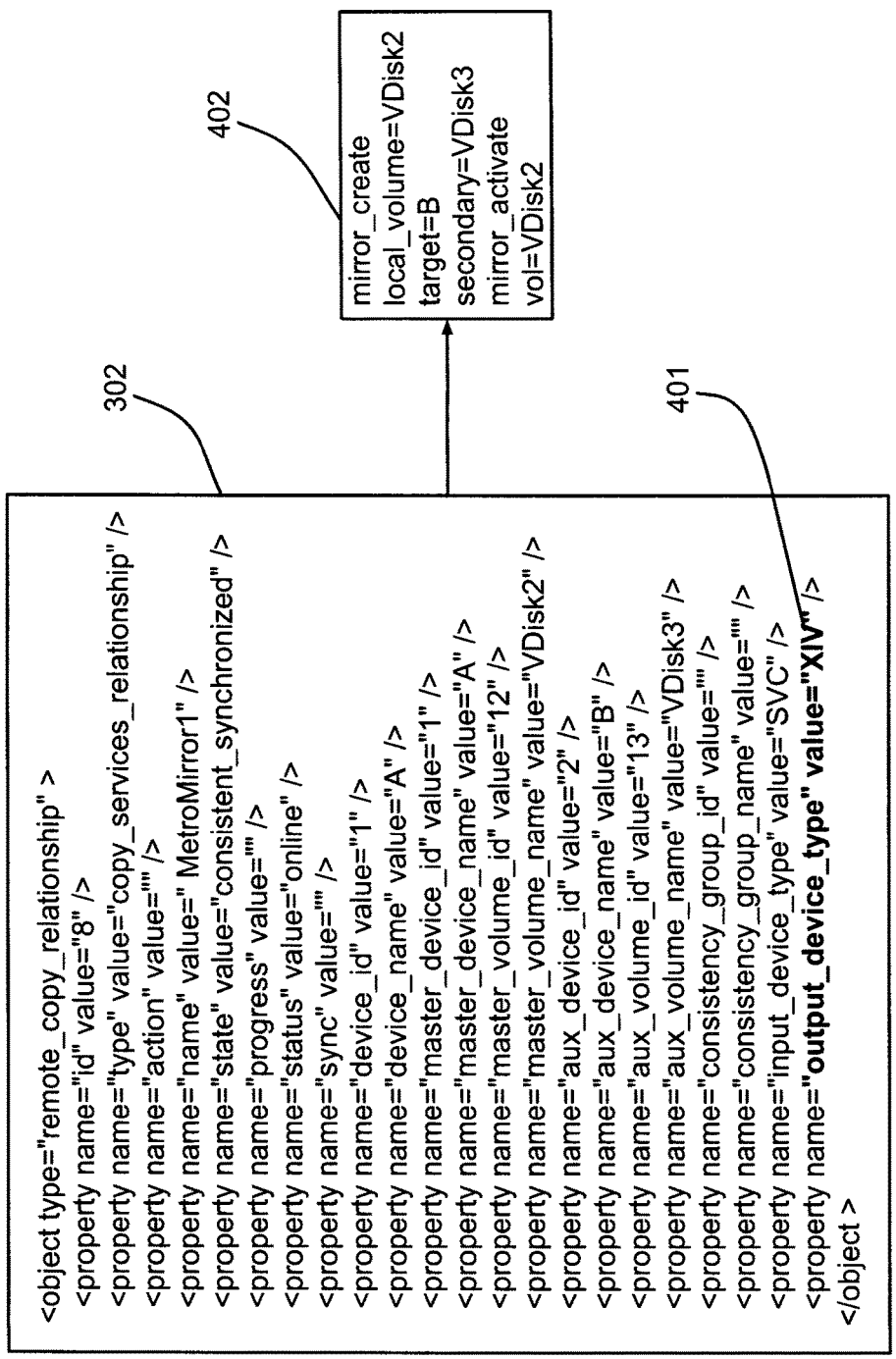
FIG. 4 is an example of the determination of storage replication system configuration commands for a second storage system of FIG. 1 from the canonical form of FIG. 3.

In the present embodiment, the first storage system 109 is an IBM™ Storage Area Network™ (SAN™) Volume Controller™ (SVC™) and the second storage system 110 is an IBM™ XIV™ Storage System. FIG. 3 shows an example set of SRSCD 301 from the first storage system 109 in SVC™ form. The SRSCD 301 defines a disk mirroring system in the form of an IBM™ Metro Mirror™. In the present example, the user has selected the IBM™ Metro Mirror™ SRS from first storage system 109 as the source SRS for transfer to a target storage system. Once selected, the SRSCD parser 202 translates the SRSCD 301 for the Metro Mirror™ into its canonical form 302 in accordance with the translation rules 204, as shown in FIG. 3. The canonical SRSCD 302 can then be edited or transmitted to a third party prior to being converted into a set of target storage system configuration commands. With reference to FIG. 4, in the present example, the user has selected the second IBM™ XIV™ Storage System 110 as the target for transfer of the Metro Mirror™ SRS. In accordance with the user's selection, the "output_device_type" parameter 401 of the canonical SRSCD 302 is modified as shown in FIG. 4. The SRSCC compiler 203 determines a suitable set of SRSCCs 402 from the canonical SRSCD 302 in accordance with the production rules 205 as shown in FIG. 4. The STSCCs 402 can then be applied to the second IBM™ XIV™ Storage System 110 so as to complete the transfer of the selected SRS from the first to the second storage system.

In the example above, it is assumed that the transfer operation compiled without contravening any of the device or policy rules 206, 207. An example of a device rule 206 is as follows:

Device Rule 1: SVC: Flash Copy target≠Metro Mirror source.

The above device rule specifies that for the specific device (an SVC™ storage system), a Metro Mirror™ source disk cannot be a Flash Copy™ target disk. If such a combination is specified in the canonical SRSCD then the SRSCC compiler 203 will present the following error message to the user via the user interface 201:

Device Error 1: SVC: A Flash Copy target cannot be set as a Metro Mirror source.

An example of a policy rule 207 is as follows:

Policy Rule 1: Average response time variance limit=40 ms

The above policy rule specifies that the difference between the average response times of storage objects or elements in a given SRS should not be greater than 40 ms. If the SRS specified in the canonical SRSCD that would include two storage elements, Disk1 and Disk2, having response times of 5 ms and 100 ms respectively, the SRSCC compiler 203 will present the following error message to the user via the user interface 201:

Policy Error 1: Average response time variance exceeds limit (40 ms).

Thus, given the above rules, if a user attempts to create a Flash Copy in an SVC that breaches the Device Rule 1 or attempts to use devices in an SRS that breach Policy Rule 1, the user is informed via the user interface 201 that such a change or feature is invalid and the determination of the relevant set of SRSCCs is aborted. The user can then edit the canonical SRSCD to remove the identified errors before resubmitting the SRSCD to the SRSCC compiler 203.

Figure 5:
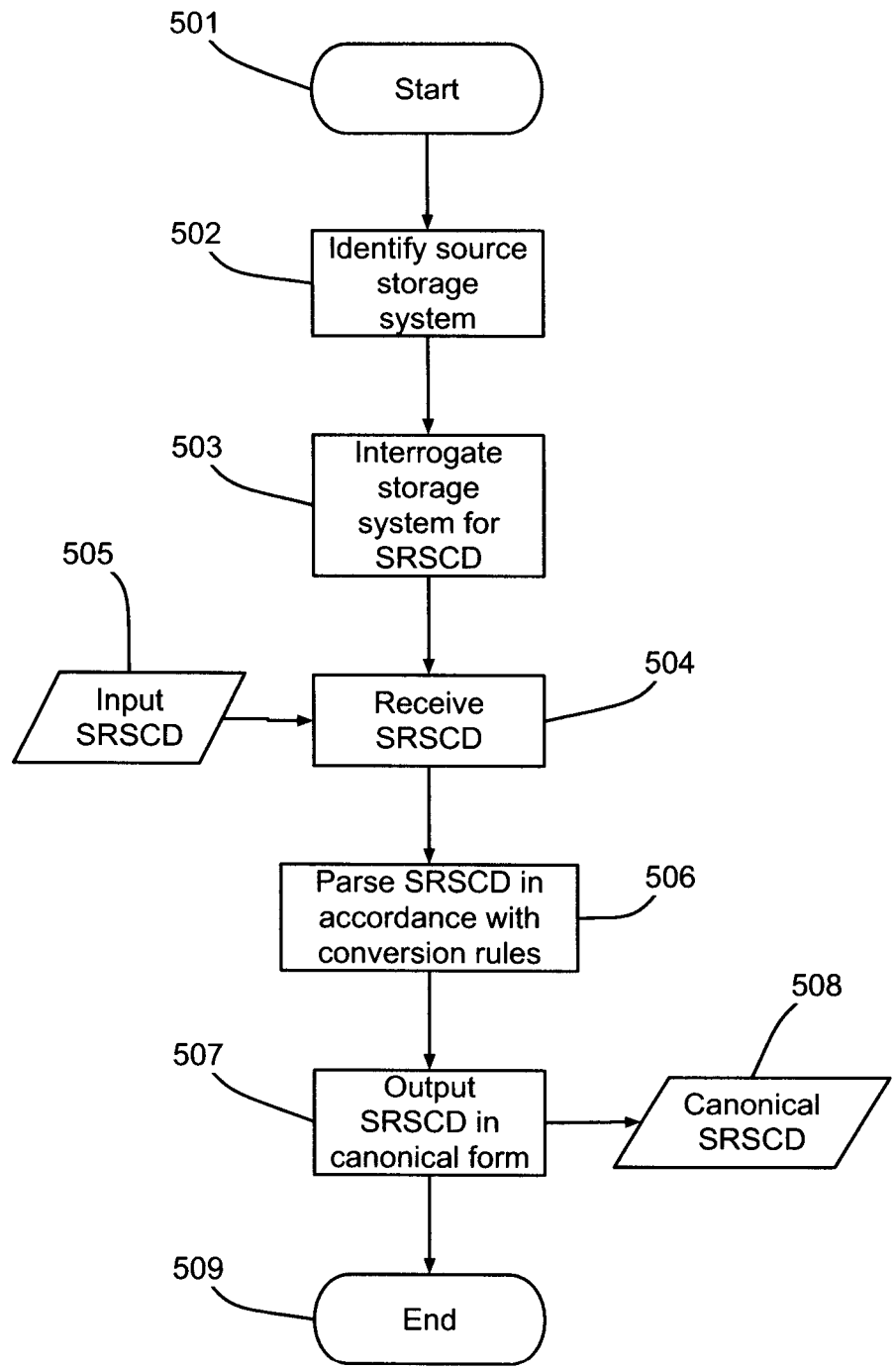
FIG. 5 is a flow chart illustrating the processing performed by the application program of FIG. 2 when performing the translation of FIG. 3.

The processing performed by the SRSCD parser 202 when translating configuration data from a device specific form into the canonical from will now be described in further detail with reference to the flow chart of FIG. 5. Processing is initiated at step 501 in response to the selection of an SRS by the user via the user interface 201 and processing moves to step 502. At step 502, the type of the source storage system is identified and processing moves to step 503. At step 503, the source system is interrogated using CLI instructions to retrieve the SRSCD for the selected storage replication system and processing moves to step 504. At step 504, the requested SRSCD 505 is received and processing moves to step 506. At step 506, the SRSCD is parsed in accordance with the SRSCD translation rules 204 and processing moves to step 507. At step 507, the canonical form of the SRSCD 508 is output and processing moves to step 509 and ends.

Figure 6:
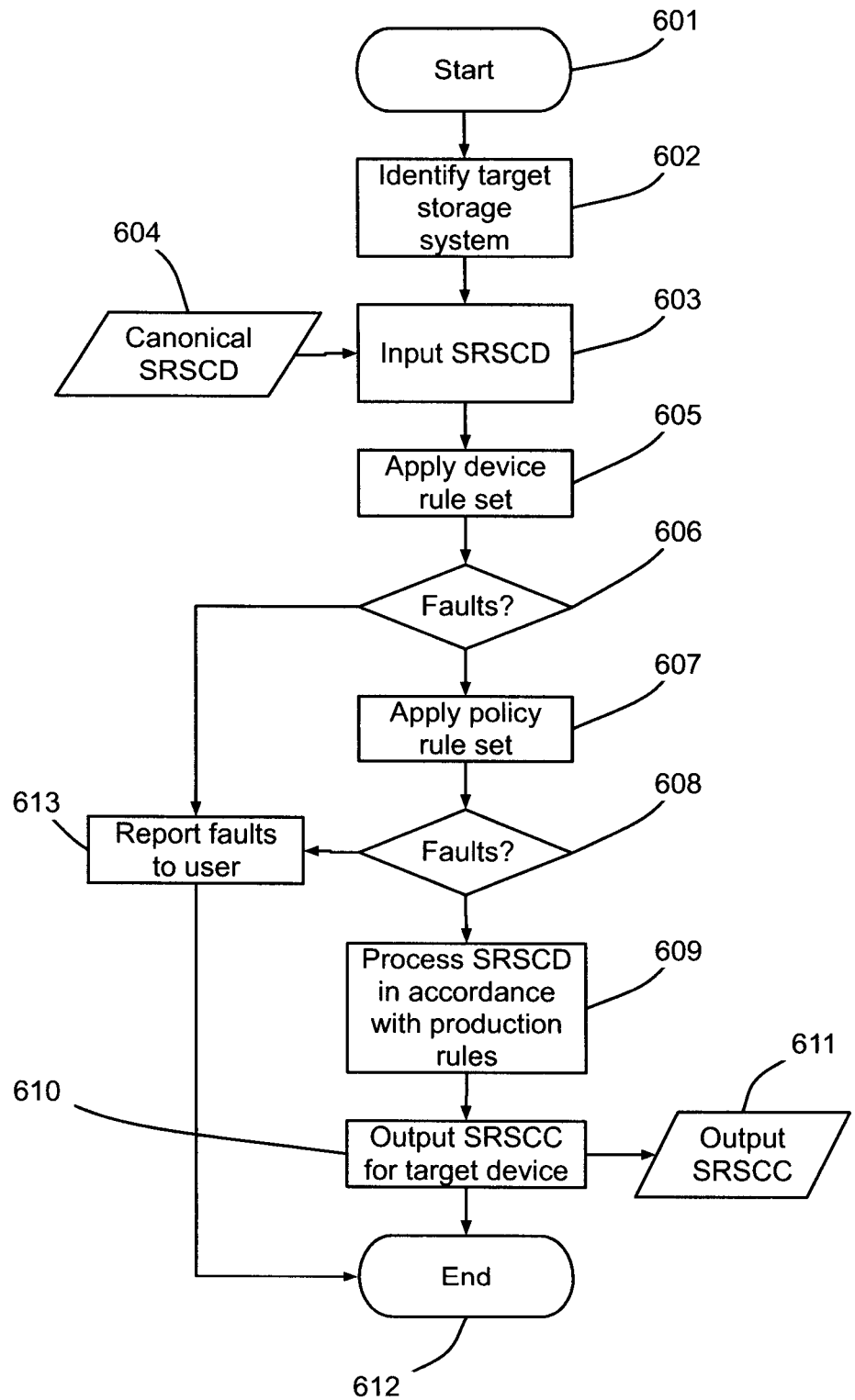
FIG. 6 is a flow chart illustrating the processing performed by the application program of FIG. 2 when performing the determination of FIG. 4.

The processing performed by the SRSCC compiler 203 when determining configuration commands for a given SRSCD will now be described in further detail with reference to the flow chart of FIG. 6. Processing is initiated at step 601 in response to the selection of an SRSCD by the user via the user interface 201, and processing then moves to step 602. At step 602, the target storage system is identified from user input via the user interface 201 and processing moves to step 603. At step 603, the canonical SRSCD 604 is input for processing and processing moves to step 605. At step 605, the device rules 206 are applied to the SRSCD 604 to identify any elements that are incompatible with the proposed target storage system and processing moves to step 606. At step 606, if no faults are found by the application of the rules in the above step then processing moves to step 607. At step 607, the policy rules 207 are applied to the SRSCD 604 to identify any elements that contravene the user-defined policy and processing moves to step 608. At step 608, if no faults are found by the application of the rules in the above step then processing moves to step 609. At step 609, the SRSCD is processed in accordance with the configuration command production rules 205 and processing moves to step 610. At step 610, the determined set of SRSCCs 611 for implementing the SRSCD 604 on the target system are output and processing moves to step 612 and ends. If at steps 606 or 608 any faults are identified in the SRSCD 604 by the application of the device or policy rules 206, 207 then processing moves to step 613. At step 613, the faults or incompatibilities are reported to the user via the user interface 201 and processing moves to step 612 and ends.

In another embodiment, the device rules are arranged to be applicable to one or more heterogeneous groups of one or more devices or to all devices. In a further embodiment, the policy rules are arranged to be applicable to one or more heterogeneous groups of one or more devices or to all devices.

In another embodiment, the functionality of the compiler as described above that applies the device and policy rules may be provided as separate or distinct functionality so as to decouple the rule checking process from the configuration command determination process.

In a further embodiment, the device or policy rules may be used to verify against any form of the SRSCD such as the source, device, or canonical form. The device or policy rules may also be arranged for application to the configuration commands that are applied to the target storage system.

As will be understood by those skilled in the art, the user interface may comprise an editor for editing the configuration data or configuration commands. The editor may be arranged to apply the device or policy rules in response to the editing of the configuration data in any of its forms or the configuration commands. Furthermore, the editor may provide a graphical interface for the editing of the data. In other words, the editor may provide a schematic or other graphical representation of the storage system, and enable editing of its configuration via user manipulation of such graphical elements.

It will be understood by those skilled in the art that the apparatus that embodies a part or all of the present invention may be a general purpose device having software arranged to provide a part or all of an embodiment of the invention. The device could be a single device or a group of devices and the software could be a single program or a set of programs. Furthermore, any or all of the software used to implement the invention can be communicated via any suitable transmission or storage means so that the software can be loaded onto one or more devices.

As will be appreciated by one of ordinary skill in the art, aspects of the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module," or "system." Furthermore, aspects of the present invention may take the form of a computer program product embodied in one or more computer-readable medium(s) having computer readable program code embodied thereon.

Any combination of one or more computer-readable medium(s) may be utilized. The computer-readable medium may be a computer-readable signal medium or a physical computer-readable storage medium. A physical computer readable storage medium may be, for example, but not limited to, an electronic, magnetic, optical, crystal, polymer, electromagnetic, infrared, or semiconductor system, apparatus, or device, or any suitable combination of the foregoing. Examples of a physical computer-readable storage medium include, but are not limited to, an electrical connection having one or more wires, a portable computer diskette, a hard disk, RAM, ROM, an EPROM, a Flash memory, an optical fiber, a CD-ROM, an optical storage device, a magnetic storage device, or any suitable combination of the foregoing. In the context of this document, a computer-readable storage medium may be any tangible medium that can contain, or store a program or data for use by or in connection with an instruction execution system, apparatus, or device.

Computer code embodied on a computer-readable medium may be transmitted using any appropriate medium, including but not limited to wireless, wired, optical fiber cable, radio frequency (RF), etc., or any suitable combination of the foregoing. Computer code for carrying out operations for aspects of the present invention may be written in any static language, such as the "C" programming language or other similar programming language. The computer code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, or communication system, including, but not limited to, a local area network (LAN) or a wide area network (WAN), Converged Network, or the connection may be made to an external computer (for example, through the Internet using an Internet Service Provider).

Aspects of the present invention are described above with reference to flow diagrams and/or block diagrams of methods, apparatus (systems) and computer program products according to embodiments of the invention. It will be understood that each block of the flow diagrams and/or block diagrams, and combinations of blocks in the flow diagrams and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flow diagram and/or block diagram block or blocks.

These computer program instructions may also be stored in a computer-readable medium that can direct a computer, other programmable data processing apparatus, or other devices to function in a particular manner, such that the instructions stored in the computer-readable medium produce an article of manufacture including instructions which implement the function/act specified in the flow diagram and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flow diagram and/or block diagram block or blocks.

The flow diagrams and block diagrams in the above figures illustrate the architecture, functionality, and operation of possible implementations of systems, methods and computer program products according to various embodiments of the present invention. In this regard, each block in the flow diagrams or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flow diagrams, and combinations of blocks in the block diagrams and/or flow diagram, can be implemented by special purpose hardware-based systems that perform the specified functions or acts, or combinations of special purpose hardware and computer instructions.

While the present invention has been illustrated by the description of the embodiments thereof, and while the embodiments have been described in considerable detail, it is not the intention of the applicant to restrict or in any way limit the scope of the appended claims to such detail. Additional advantages and modifications will readily appear to those skilled in the art. Therefore, the invention in its broader aspects is not limited to the specific details representative apparatus and method, and illustrative examples shown and described. Accordingly, departures may be made from such details without departure from the scope of applicant's general inventive concept.

The invention claimed is:

1. A method for transferring a storage replication system between storage systems, said method comprising the steps of:
retrieving storage replication system configuration data for a source storage system, said storage replication system configuration data being data representing a configuration of a storage replication system, said storage replication system configuration data being provided in a source form for said source storage system;
translating said storage replication system configuration data from said source form into a canonical form for representing said storage replication system;

determining a set of configuration commands for implementing said storage replication system configuration data on a target storage system based on said canonical form of said translated storage replication system configuration data and a predetermined set of one or more storage system specific rules, the storage system specific rules applicable to heterogeneous groups of devices; and transferring the storage replication system from said source storage system to said target storage system, said configuration commands being used to configure said storage replication system on said target storage system.

2. The method according to claim 1, further comprising:
selecting said target storage system for transfer of said storage replication system, said target storage system having a different form of storage replication system configuration data from the source storage system;
determining the set of one or more storage system specific rules for identifying the compatibility of elements of said storage replication system with said target storage system; and
applying said storage system specific rules to said canonical form of said storage replication system configuration data for said source storage system so as determine whether said storage replication system is compatible with said target storage system.

3. The method according to claim 1, further comprising:
determining a set of one or more user defined policy rules for determining whether elements of said storage replication system meet one or more predetermined performance criteria with respect to said target storage system; and
applying said user defined policy rules to said storage replication system with respect to said target storage system so as to determine whether said storage replication system would meet said predetermined performance criteria if configured on said target storage system.

4. The method according to claim 3 in which said rules are arranged for application to said storage replication system configuration data in said canonical form.

5. The method according to claim 4 in which said rules are applied to said storage replication system configuration data in response to said translation into said canonical form.

6. The method according to claim 4 in which said rules are applied to said storage replication system configuration data in response to editing of said storage replication system configuration data in said canonical form.

7. The method according to claim 1 in which said storage replication system configuration data is retrieved from said source storage system via one or more command line interface (CLI) queries.

8. The method according to claim 1 in which said set of configuration commands for said target system comprise CLI commands.

9. The method according to claim 1 in which a graphical user interface (GUI) is provided for editing said storage replication system configuration data in said canonical form.

10. The method according to claim 1 further comprising the step of receiving storage replication system configuration data in said canonical form from a third party for editing or determining a set of configuration commands for configuring a storage replication system on a target storage system.

11. A computer system for transferring a storage replication system between storage systems, the computer system comprising:

a hardware processor coupled to a memory including instructions to:
retrieve storage replication system configuration data for a source storage system, said storage replication system configuration data being data representing a configuration of a storage replication system, said storage replication system configuration data being provided in a source form for said source storage system;
translate said storage replication system configuration data from said source form into a canonical form for representing said storage replication system;
determine a set of configuration commands for implementing said storage replication system configuration data on a target storage system, based on said canonical form of said translated storage replication system configuration data and a predetermined set of one or more storage system specific rules, the storage system specific rules applicable to heterogeneous groups of devices; and
transfer said storage replication system from said source storage system to said target storage system, said configuration commands being used to configure said storage replication system on said target storage system.

12. The computer system according to claim 11, wherein the processor is further configured to:
select said target storage system for transfer of said storage replication system, said target storage system having a different form of storage replication system configuration data from the source storage system;
determine the set of one or more storage system specific rules for identifying the compatibility of elements of said storage replication system with said target storage system; and
apply said storage system specific rules to said canonical form of said storage replication system configuration data for said source storage system so as determine whether said storage replication system is compatible with said target storage system.

13. The computer system of claim 11, wherein:
the processor is further configured to determine a set of one or more user defined policy rules for determining whether elements of said storage replication system meet one or more predetermined performance criteria with respect to said target storage system, and
apply said user defined policy rules to said storage replication system with respect to said target storage system so as to determine whether said storage replication system would meet said predetermined performance criteria if configured on said target storage system.

14. The computer system of claim 11 wherein the processor is further configured to retrieve said storage replication system configuration data from said source storage system via one or more command line interface (CLI) queries.

15. The computer system of claim 11 wherein said set of configuration commands for said target system comprise CLI commands.

16. The computer system of claim 11 further comprising a graphical user interface (GUI) in communication with the processor, the GUI configured for editing said storage replication system configuration data in said canonical form.

17. The computer system of claim 11 wherein the processor is further configured to receive storage replication system configuration data in said canonical form from a third party for editing or determining a set of configuration commands for configuring a storage replication system on a target storage system.

18. A non-transitory computer program product on a physical computer-readable medium for transferring a storage replication system between storage systems, the product comprising:
    computer code for retrieving storage replication system configuration data for a source storage system, said storage replication system configuration data being data representing a configuration of a storage replication system, said storage replication system configuration data being provided in a source form for said source storage system;
    computer code for translating said storage replication system configuration data from said source form into a canonical form for representing said storage replication system;
    computer code for determining a set of configuration commands for implementing said storage replication system configuration data on a target storage system, based on said canonical form of said translated storage replication system configuration data and a predetermined set of one or more storage system specific rules, the storage system specific rules applicable to heterogeneous groups of devices; and
    computer code for transferring said storage replication system from said source storage system to said target storage system, said configuration commands being used to configure said storage replication system on said target storage system.

19. The computer program product of claim 18, further comprising:
    computer code for selecting said target storage system for transfer of said storage replication system, said target storage system having a different form of storage replication system configuration data from the source storage system;
    computer code for determining the set of one or more storage system specific rules for identifying the compatibility of elements of said storage replication system with said target storage system; and
    computer code for applying said storage system specific rules to said canonical form of said storage replication system configuration data for said source storage system so as determine whether said storage replication system is compatible with said target storage system.

20. The computer program product of claim 18, further comprising:
    computer code for determining a set of one or more user defined policy rules for determining whether elements of said storage replication system meet one or more predetermined performance criteria with respect to said target storage system; and
    computer code for applying said user defined policy rules to said storage replication system with respect to said target storage system so as to determine whether said storage replication system would meet said predetermined performance criteria if configured on said target storage system.

* * * * *